United States Patent [19]

Brown

[11] Patent Number: 4,677,921
[45] Date of Patent: Jul. 7, 1987

[54] AGRICULTURAL CHEMICAL APPLICATOR

[76] Inventor: Max A. Brown, 316 Framington Dr., Plantation, Fla. 33317

[21] Appl. No.: 828,222

[22] Filed: Feb. 10, 1986

[51] Int. Cl.$^4$ ............................................. A01C 23/02
[52] U.S. Cl. ............................................. 111/6; 111/91
[58] Field of Search ............................. 111/6, 7, 89–91; 251/174, 175, 176, 180, 181, 186, 174, 309; 137/625.11, 625.16, 625.47

[56] References Cited

U.S. PATENT DOCUMENTS

| | | | |
|---|---|---|---|
| 2,649,061 | 8/1953 | Hawkins et al. | 111/6 |
| 2,866,422 | 12/1958 | Colson | 111/6 |
| 2,876,718 | 3/1959 | Vaughn | 111/7 |
| 3,008,490 | 11/1961 | Angelos | 137/625.11 |
| 3,154,031 | 10/1964 | Kappelmann | 111/7 |
| 3,370,612 | 2/1968 | Holl | 137/625.47 |
| 3,773,078 | 11/1973 | Suntheimer | 137/625.11 |
| 4,178,860 | 12/1979 | Hines et al. | 111/7 |
| 4,545,408 | 10/1985 | Sonneborn | 251/180 |

FOREIGN PATENT DOCUMENTS

| | | | |
|---|---|---|---|
| 925503 | 3/1955 | Fed. Rep. of Germany | 111/6 |
| 1107575 | 1/1956 | France | 111/6 |
| 397152 | 1/1974 | U.S.S.R. | 111/6 |

OTHER PUBLICATIONS

Article from Cooperative Extension Service, Iowa State University and Technology and the United States Department of Agriculture, distributed according to the Acts of Congress, May 8 and Jun. 30, 1914, "Schematic of Point-Injector Fertilizer Applicator".

*Primary Examiner*—James R. Feyrer
*Attorney, Agent, or Firm*—Malin, Haley & McHale

[57] ABSTRACT

A rolling point agricultural spiked wheel injector system for injecting a fluid as a liquid chemical or gas into the ground. The system includes a rotatable injector wheel having a plurality of outwardly directed injector spikes attached to the periphery of the wheel, the spokes being so constructed to easily penetrate the ground for injection of fluid therein. The injector wheel includes a unique rotary valve mechanism of simplistic design selectively operable for permitting fluid to flow when the spike is in the ground penetrating position and blocking the flow of fluid when the spike is out of the ground. The valve sealing system allows free rotation of the wheel with greater sealing pressure over a smaller contact area. The improved valve is a self-cleaning device for movement of abrasive particles in the liquid chemical material around the bearing face of the valve that engages the rotating ribbon surface of the ring with the plurality of openings. The abrasive material destroys the positive seal in the prior devices. In the present valve, the overall bearing surface between the axle and the bearing is not great or tight; it is machined with some space between axle and bearing surface. The tight, interfacial contact creating the valve seal has a very small surface area and, therefore, very little total friction and very little resistance to roll. The plug-like valve surface pressed against the smooth bearing surface creates a positive seal with very little friction.

5 Claims, 8 Drawing Figures

4,677,921

AGRICULTURAL CHEMICAL APPLICATOR

BACKGROUND OF THE INVENTION

Chemical applicators for relatively deep injection of fertilizers into the ground are well-known as described in U.S. Pat. Nos. 2,649,061 to Hawkins et al. and 3,602,166 to Peterson and 3,025,806.

SUMMARY OF THE INVENTION

This invention relates to a rolling point agricultural spiked wheel injector system for injecting a fluid as a liquid chemical or gas into the ground. The system includes a rotatable injector wheel having a plurality of outwardly directed injector spikes attached to the periphery of the wheel, the spokes being so constructed to easily penetrate the ground for injection of fluid therein. The injector wheel includes a new and improved valve means of simplistic design selectively operable for permitting fluid to flow in an agricultural spike wheel injector system when the spike is in the ground penetrating position and blocking the flow of fluid when the spike is out of the ground.

One object of the invention is a valve mechanism in an agricultural spiked wheel injector system that is of less complexity than previously taught in this art yet achieving the same advantages and results and resulting in decreased manufacturing expenditure, minimal resistance to roll (friction) while creating a very positive seal to valve ports.

Another object of the invention is in virtually eliminating losses of surface applied nitrogen through run off and volatilization.

Yet another object of the invention by the incorporation of the novel valve mechanism is in reduced horsepower requirements thereby reducing fuel consumption with consonant lessening of capital investment requirements.

A yet further object of the invention is in reduction or substantial elimination of corrosion problems, virtual elimination of nitrogen losses through runoff and volatilization.

Another object of the invention is in the self-flushing and wiping away of abrasive grit contained in the chemicals or from the soil which destroys the valve seal of other designs, thereby reducing maintenance costs, reducing service costs and loss of fertilizing costs due to seal failure as in prior art devices.

Other objects of the invention will be readily apparent to those skilled in the art in light of the following detailed description and accompanying drawing.

DETAILED DESCRIPTION OF THE INVENTION

Figure 1:
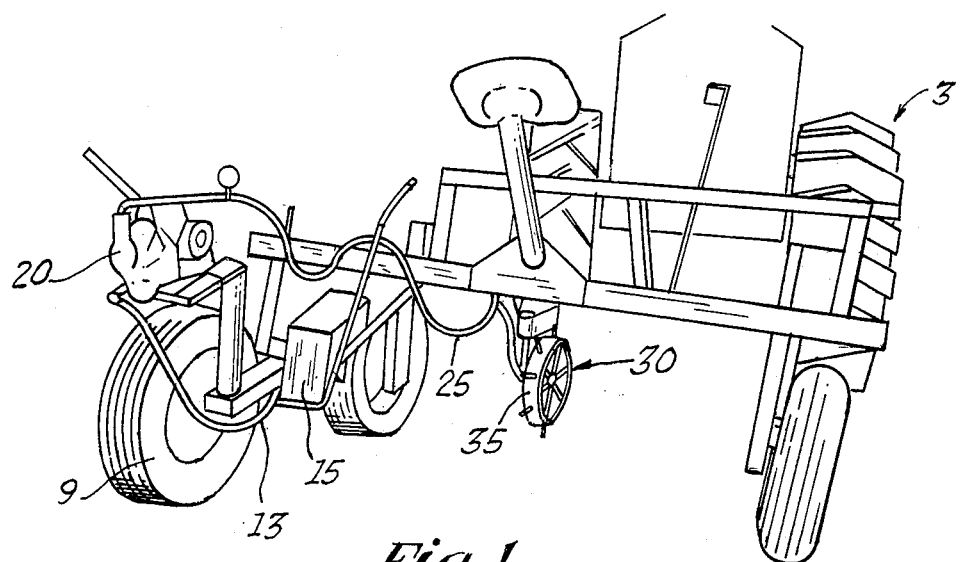
FIG. 1 is a elevation view of the rolling point agricultural spiked wheel injector or system illustrating the chemical applicator adapted to be attached to a hitch of a tractor.
Figure 2:
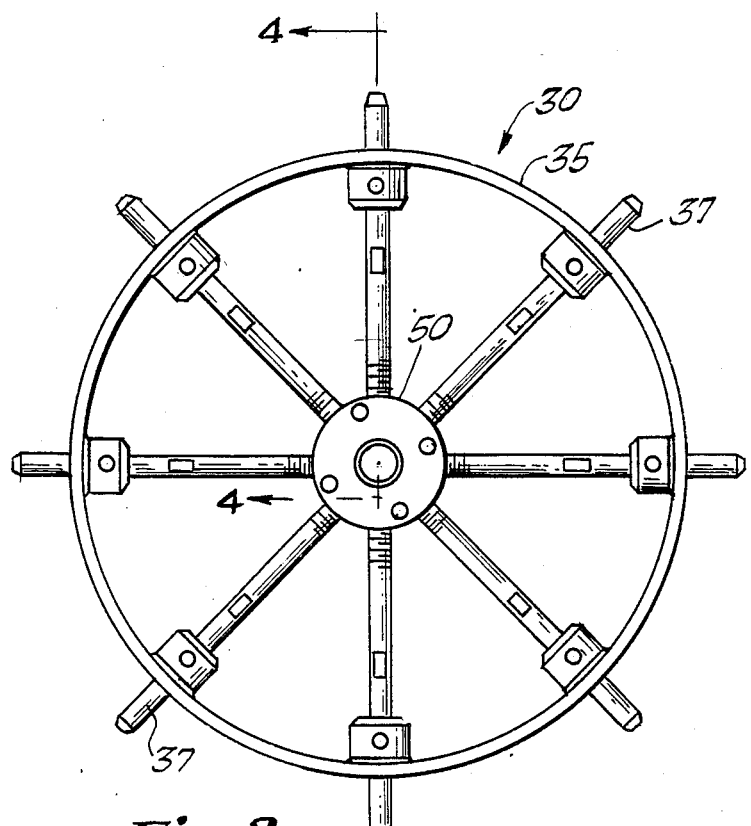
FIG. 2 is an enlarged detail side view of the mounting of the ground penetrating members in the spiked wheel.
Figure 3:
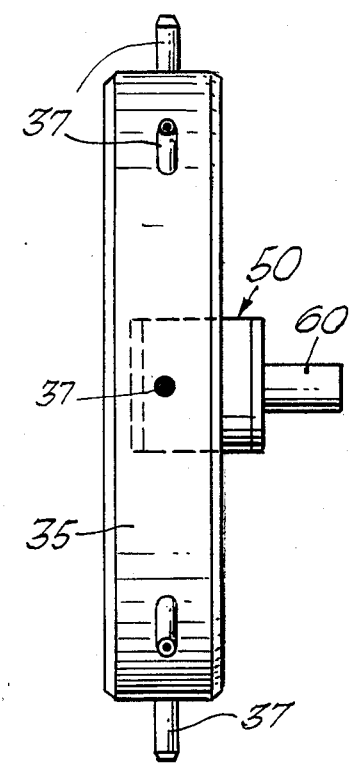
FIG. 3 is an enlarged detailed end view of the spiked wheel.

Referring now in detail to the invention, FIG. 1 illustrates an illustration of the agricultural chemical applicator generally indicated by numeral 10 and includes one fluid storage tank 15 containing the agricultural chemical and a conventional fluid pump 20, such as piston, diaphragm, centrifugal type pump may be used. The pump 20 may be driven by connections to a ground drive wheel. The pump 20 may be a piston, diaphragm, gear, centrifugal or other type of pump that will effect flow of chemicals via conduit 25 to a selected one of the several point injector spiked wheels 30 fixedly mounted and supported on a circular wheel member 35 also shown in FIG. 2. The axle of the circular wheels 35 may be mounted for rotation between a pair of vertical or horizontal bar members adapted to be connected by conventional means to a tractor 37 or other motive means for transverse movement of said wheel.

Figure 6:
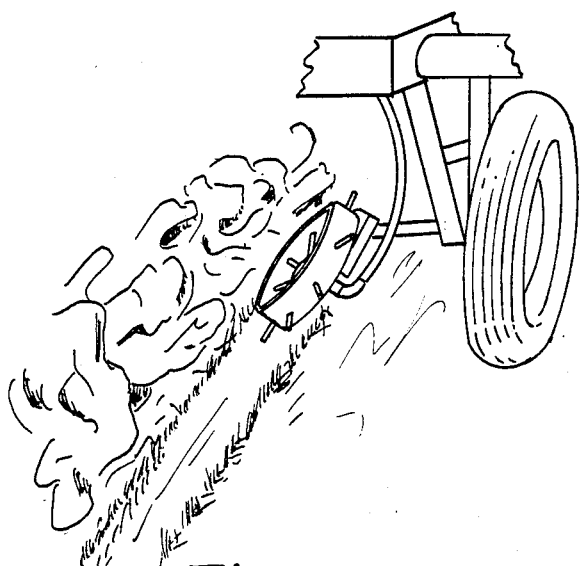
FIG. 6 is an illustration of the spiked wheel in use.
Figure 7:
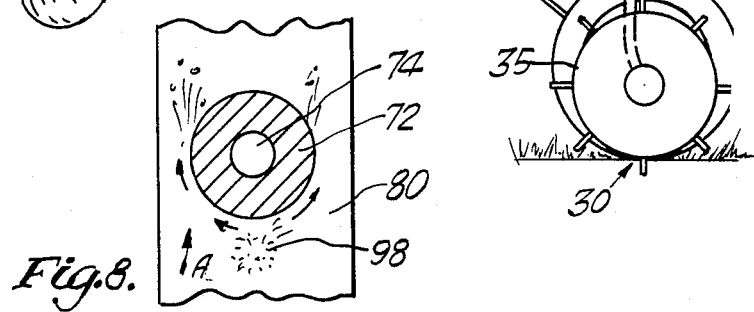
FIG. 7 is another illustration of the spiked wheel in use.

A pulley belt or chain 45 may be used as shown in FIG. 7. A pulley is fixedly secured to one side of ground drive wheel 9' and is operatively connected via pully belt 45 to pulley wheel 47 having a link bar 48 which has one end pivotally mounted eccentrically thereto. The opposite end of the link bar 48 is connected to the piston of the piston pump 40 that may thereby effect operation of the piston pump moving fluid into the spiked wheel 30. Alternatively belt 45 may be omitted and the piston pump operated by a separate motive source. In FIG. 6 the spiked wheel is shown to be used at an angle other than vertical.

Figure 4:
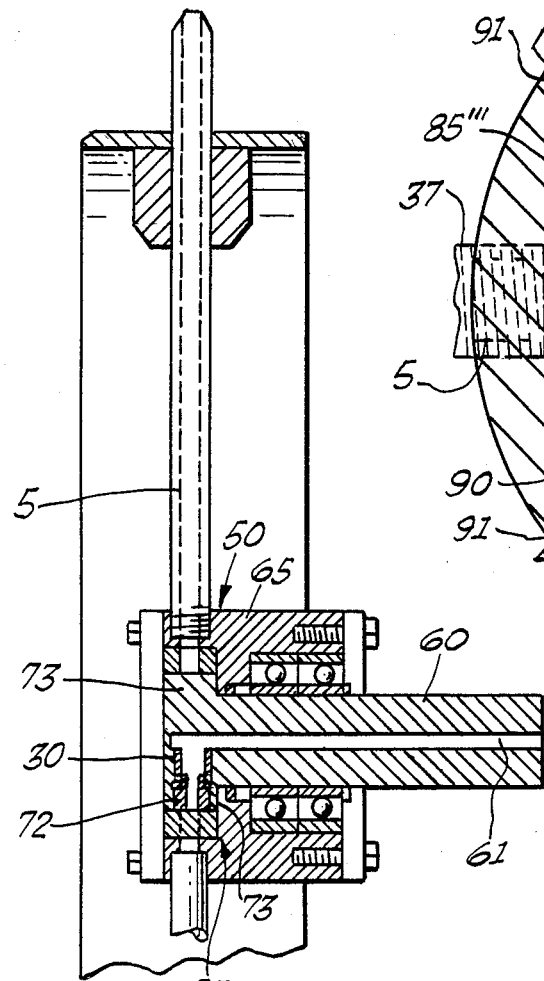
FIG. 4 is an enlarged partial section end view of showing the valve mechanism.
Figure 5:
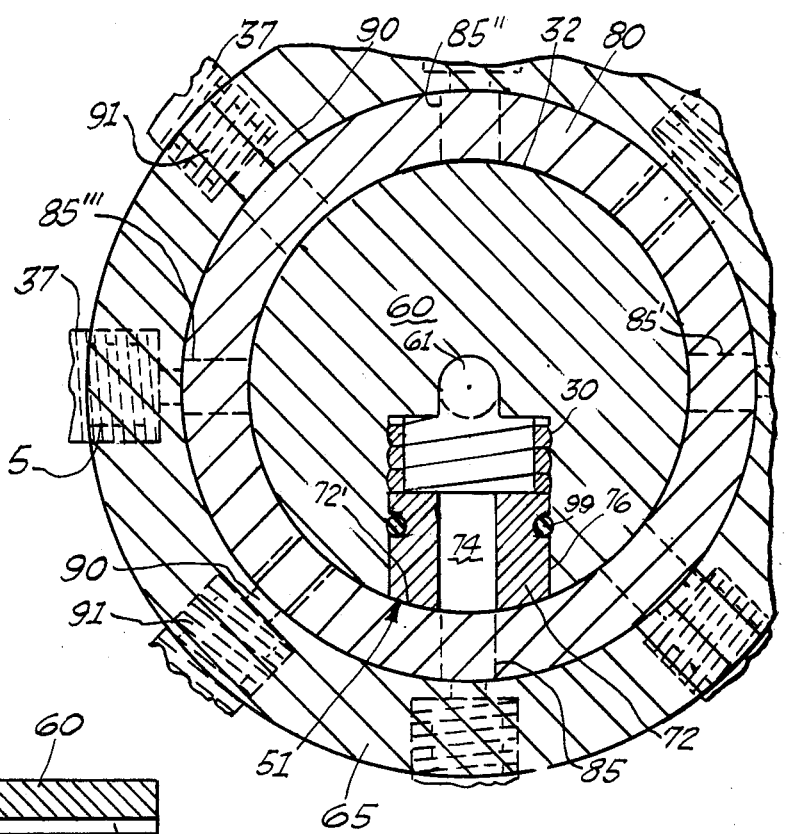
FIG. 5 is an enlarged side view partly in section of the valve mechanism.

The hub 50 includes the valve means 51 of the invention. The hub 50 and valve 51 is shown in FIGS. 4 and 5. Pump 20 or 40 and storage tank 15 or 15' are connected by line 13 or 13' and may be supported on the tractor or other supporting means.

FIGS. 4 and 5 illustrate in greater detail the valve means 51 in hub 50. Valve means 51 includes a non-rotatable hollow axle 60 communicating with a source of agricultural chemical in tank 15 or 15' via conduit 25 or 25'. A solid imperforate drum member 65 is functionally integral with hub member 50 and includes valve means 51 which includes a freely movable element 72 having a passageway 74 therethrough communicating with hollow axle 60 with conduit 61 that is connected to line 25 or 25'. Valve element 72 is freely movable in a recess 76 in the axle extension 73 of axle 60 and is normally biased by spring 30 into liquid and gas-tight engagement with the inner surface 32 of a rotatable bearing element 80 formed of Teflon, ultra high molecular weight plastic, ceramic, metal or other well-known materials inert to the agricultural chemicals and highly resistant to abrasion are used. Same material may be used for member 72. The spring or other similar biasing means 30 is freely positioned in recess 76. Bearing element 80 includes a plurality of spaced passages 85, 85', 85" and 85'''. A number of passages between opening 85' 85', etc. and the spike openings 5 in each spike 37 are shown by numeral 90. Six spikes have been illustrated buy more or less spikes may be utilized.

The edge 72' of the valve piston 72 normally in contact with the surface 32 of the bearing element 80 functions as the positive valve seal and in effect as a wiper or plow to remove accumulations of chemical crystals, sand and other undesirable solid materials from the surface 32 of the bearing element 80 which would abrade the valve seal faces or edge 72' and destroy its positive seal. Accumulated material would also destroy the inner surface of bearing element 80. The aforementioned hub 50 is formed of at least two concentric parts, one being the bearing element 80 which is freely rotatable about axle 60.

A sealing grease may be placed between bearing element 80 and drum member 65, an O-ring seal 99 is located around valve piston 72 and used to prevent the agricultural material from escaping from 74 while allowing piston or plug or plunger 72 to move in 76.

As shown in FIG. 5, the two part hub 50 of spiked wheel 30 includes apertures 91 in drum member 65 for receiving and supporting the injector spikes 37.

OPERATION

The operation of the agricultural applicator of the present invention is briefly summarized.

Earth traversing movement of the spiked wheel connected to a conventional vehicle, such as a tractor. A ground wheel 9' imparts rotation of pulley wheel with consequent operation of pump via belt, pulley wheel and link bar thereby causing flow of fluid via conduit 25' to valve 51 shown in FIG. 7.

As earth traversing movement is imparted to the wheel 35 the respective spikes 37 are inserted into the earth and withdrawn therefrom in substantially vertical position or at another angle as shown in FIG. 6.

Figure 8:
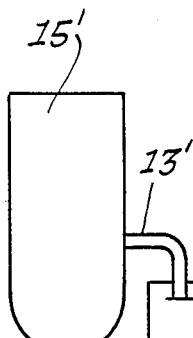
FIG. 8 is a view of a portion of the bearing element with the valve piston in engagement with the surface of the bearing element.

When a spike 37 is about to enter the ground the passageway 74 in valve 72 will communicate with passage 85 of bearing element 80 which communicates with the channel 5 of spike 37 thereby permitting flow of fluid through the spike; however, on withdrawing of the spike from the ground, valve 72 will be biased into contact with the imperforate area of bearing element 80 between openings 85, 85', etc. which effectively seals off flow of fluid. The plow-like affect shown in FIG. 8 of the circular edge of the valve piston 72 maintains the bearing surface free of undesirable accumulations 98 of abrasive grit on the surface of bearing element 80 which is moving in the direction of arrow A. The grit will move around the valve piston as illustrated and away from the path of opening 74.

The fluid agricultural applicator has multiple point-injectors for penetrating the ground for injecting fluid therein with valve means selectively permitting fluid to flow through one of the injectors only during ground penetration. Other agricultural fluid injector wheels have been and are now in use. The principal advantage to this one is the unique rotary valving mechanism. The primary advantages of this rotary valve mechanism are the sliding, friction area of the two rotary surfaces—the stationary single port and the rotating multiple port—press against each other creating the positive seal. In the prior devices the whole axle rubs against the whole bearing surface very tightly to create a seal. The friction and resistance to roll was large. Such devices required grease fittings to periodically lubricate the surfaces. Liberal use of grease would freeze the wheel from rotating and too little grease and heat builds up.

In the present valve, the overall bearing surface between the axle and the bearing is not great or tight; it is machined with some space between axle and bearing surface. The tight, interfacial contact creating the valve seal has a very small surface area and, therefore, very little total friction and very little resistance to roll. The plug-like valve surface pressed against the smooth bearing surface creates a positive seal with very little friction. The improved valve is a self-cleaning device for movement of abrasive particles shown in FIG. 8 in the liquid chemical material around the bearing face 72' of the valve 72 that engages the rotating ribbon surface of the ring 80 with the plurality of openings 85, 85' etc. The abrasive material destroys the positive seal in the prior devices.

In the past sand and other gritty substances, which pass the agricultural fluid filtering devices or fall in through spokes, abrade the smooth surfaces which create the positive valve seal and destroy the operation of the rotary valve and the injection wheel. The cylindrical plug-like valve of the present invention plows or wipes gritty material away from the valve seal surfaces to avoid destruction.

It is recognized that departures from the disclosure herein may be made therefrom within the scope of our invention, which is not to be limited to the details disclosed herein, but is to be accorded the full scope of the claims as to embrace any and all equivalent devices.

What is claimed is:

1. A soil treating apparatus comprising:
a first means adapted to be advanced on the ground in rolling contact therewith;
a plurality of hollow spike means connected and mounted on said first means and projecting outwardly therefrom and so constructed and arranged to sequentially penetrate the ground and to withdraw therefrom;
a fluid means connected to said hollow means for providing a source of fluid that flows through said hollow means into the ground;
mounting means connected to said first means for positioning said first means for rolling contact with the ground;
said mounting means including valve means for permitting flow of fluid from said fluid means through mounting means, said valve means and said hollow means to restrict the flow of fluid out through said hollow means;
said valve means including
a relatively fixed member including a passageway, said fixed member connected to said mounting means;
a relatively movable member mounted in intimate, slidable engagement with said relatively fixed member, said relatively movable member connected to and rotatable with said first means and including a plurality of spaced passages in a circular band shaped face adapted to selectively and singularly communicate with said passageway, the areas between said passages being imperforate each of said plurality of spaced passages operably connected to one of said hollow means;
said relatively fixed member including a recess extending only partially through the thickness thereof and coextensive with said passageway;
a plug-like element of substantially the same shape and size of said recess freely movable within said recess, said plug-like element including a passage therethrough communicating with said passageway and adapted to communicate with a selected one of said spaced passages of said relatively fixed member, said plug-like element having a sealing face of a relatively small surface area; and biasing means in said recess operable to continuously urge said sealing face of said plug-like element into engagement with said band shaped face of said relatively fixed element.

2. A valving device as recited in claim 1 wherein each of said relatively fixed and movable members are circularly shaped in cross section.

3. A valving device as recited in claim 2 wherein said relatively movable member includes a very smooth, abrasion resistant synthetic resinous bearing, said bearing being in direct interfacial contact with said relatively fixed member.

4. A valving device as recited in claim 1 further including a plurality of hollow tubular spike elements extending outwardly from the relatively movable member, each of said spike elements mounted in communication with a corresponding passage in said movable member.

5. A valving device as recited in claim 4 further including a source of fluid and means for feeding said fluid to a selected one of said plurality of hollow spikes.

* * * * *